United States Patent [19]

Fernando et al.

[11] 4,306,893
[45] Dec. 22, 1981

[54] SNAP-IN ASSEMBLY FOR BAG FILTER

[75] Inventors: James U. R. Fernando; Gary C. Goetschius; Kent E. Ritter, all of Wellsville, N.Y.

[73] Assignee: The Air Preheater Company, Inc., Wellsville, N.Y.

[21] Appl. No.: 201,675

[22] Filed: Oct. 28, 1980

[51] Int. Cl.³ .................... B01D 46/04; B01D 29/14
[52] U.S. Cl. ........................................ 55/302; 55/379
[58] Field of Search ................ 55/302, 378, 379; 210/323.2, 333.1

[56] References Cited
U.S. PATENT DOCUMENTS 4,105,421  8/1978  Rheinfrank, Jr. et al. ............ 55/379
4,149,863  4/1979  Ballard ................................ 55/302

FOREIGN PATENT DOCUMENTS 2377832  9/1978  France ................................ 55/379

Primary Examiner—David L. Lacey
Attorney, Agent, or Firm—Wayne H. Lang

[57] ABSTRACT

A bag filter arrangement having a cleaning system that exhausts a reverse pulse of compressed air through the bags thereof to remove collected dust particles from the surface of the bags. The arrangement is directed to a special cooperation of interlocking elements that positively align the several elements thereof in order that maximum dust removal is effected.

3 Claims, 3 Drawing Figures

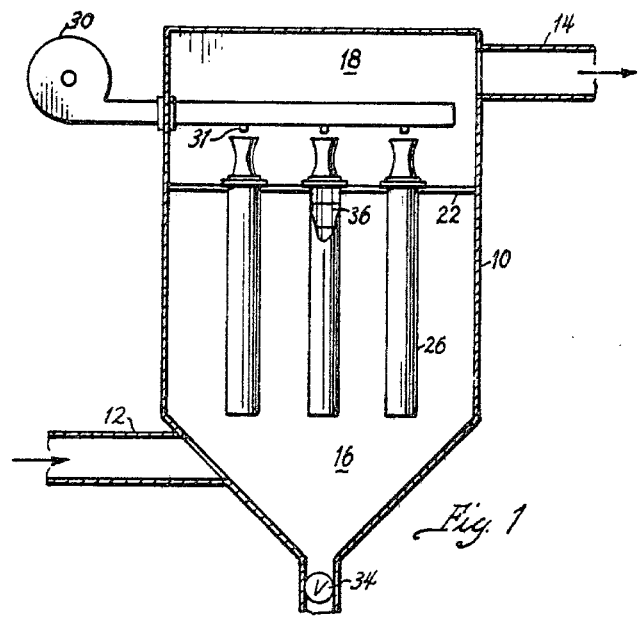
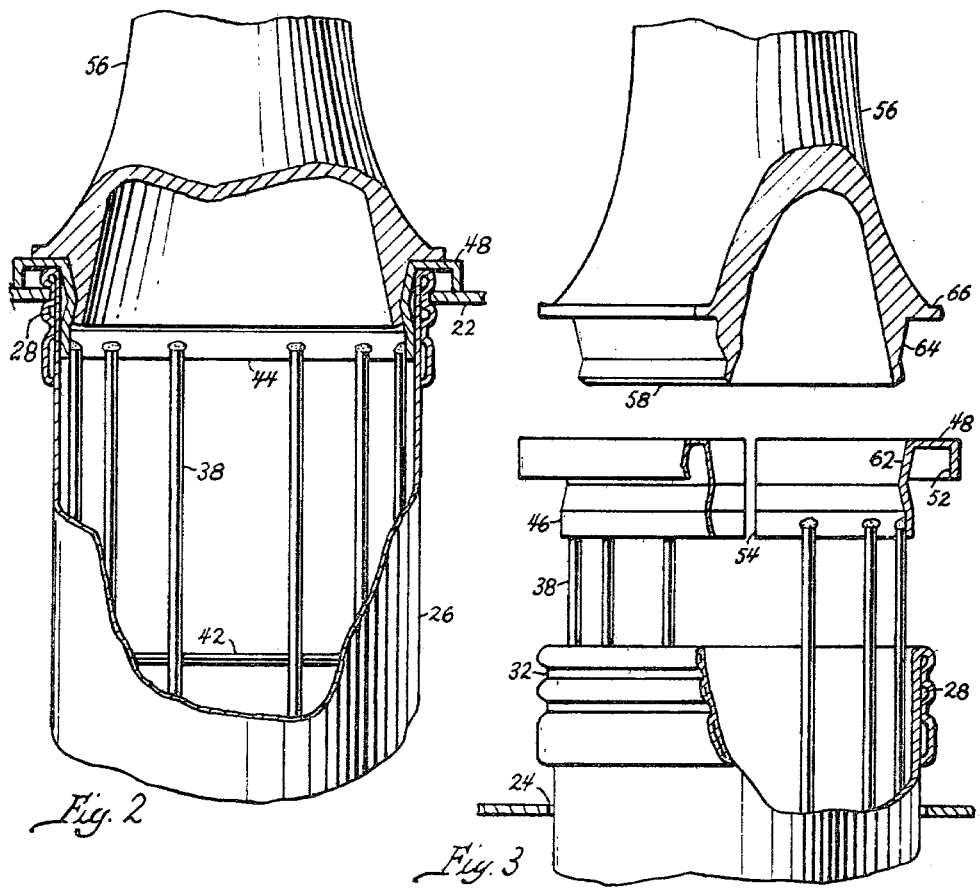

SNAP-IN ASSEMBLY FOR BAG FILTER

BACKGROUND OF THE INVENTION

This invention relates to bag filter apparatus that is adapted to receive gas carrying a quantity of dust or other particulate matter and permit clean gas only to pass therethrough while retaining the particulate matter on the surface of the bag filter apparatus. To remove collected dust from the surface of the filter, a blast of compressed air is then exhausted into the open end of a filter bag to momentarily reverse the flow of gas therethrough and cause a reverse flexing of the bag and removal of the collected dust therefrom. To amplify the action of the blast of compressed air, a venturi is usually spaced above the end of the filter bag and aligned with the blast of cleaning air. Inasmuch as an apertured tube sheet separates the dust laden inlet gas from the clean outlet gas, the venturi is carried by said tube sheet and it opens outward toward the source of compressed cleaning air. To prevent each bag from collapsing when subjected to the flow of dust bearing gas to be cleaned, wire frames or cages are inserted into each bag, thus providing a structural support therefor.

DESCRIPTION OF PRIOR ART

Known art is directed to various arrangements that support the venturi, the support cage and surrounding filter from an apertured tube sheet by passing a bag support over a detent to produce a spring action that holds the several elements in an integral assembly.

In a bag filter that depends upon a reverse blast of compressed air to remove deposits on dust that have collected upon the surface thereof, it has been found that an accurate alignment of various elements with the blast of cleaning air is essential in order that all parts of the bag may be subjected to maximum cleaning action by the cleaning air. In some installations the venturi section may be spaced above, while in others it may extend into each bag filter. Whatever arrangement is used, however, concentric alignment of parts is required for optimum results.

U.S. Pat. No. 4,157,901 is representative of the many arrangements that have been developed to hold a bag filter assembly in a given position in an apertured tube sheet. While a support for the bag filter snaps readily in place, its angle of assembly may vary greatly, and a venturi tube adapted to receive the cleaning air being projected thereto may receive only a portion of intended amount.

U.S. Pat. No. 3,876,402 shows a bag filter arrangement in which a venturi element rests upon the open end of a cage assembly. There is no arrangement for locking elements together to maintain continuous alignment with a jet of cleaning air.

U.S. Pat. No. 3,798,878 shows a reverse air bag filter arrangement wherein a venturi means is positively bolted in position to properly receive the air from a source of compressed air, but there is no support cage for the filter. Although this patent recognizes the importance of properly aligning the venturi section with the bag filter, an assembly as defined would be slow and expensive to assemble, and it would fail to contain the essential elements claimed herein.

SUMMARY OF THE INVENTION

This invention therefore has as its principal objective the provision of an arrangement by which a support cage for a cylindrical filter bag and a concentric venturi tube fitting are positively aligned with a source of cleaning air to effect a maximum flow of cleaning air through each bag which results in optimum cleaning of each filter bag. The invention discloses a system of interlocking elements that are quickly assembled with a minimum of tools. Moreover, the arrangement is compact and it utilizes a minimum of materials to provide a maximum effectiveness at a minimum of cost.

BRIEF DESCRIPTION OF THE DRAWING

FIG. 1 shows a side elevation of a filter housing including a series of filter bags suspended in accordance with this invention, FIG. 2 is an enlarged view of the present invention, and FIG. 3 is an exploded view of the device.

DESCRIPTION OF THE PREFERRED EMBODIMENT

The apparatus of the present invention includes an outer housing 10 having an inlet 12 for dust carrying gas and an outlet 14 for clean gas. The housing is divided into inlet and outlet compartments 16 and 18 by a tube sheet 22 having a series of apertures 24 therein.

Into each aperture of the tube sheet is fitted an elongate filter bag 26 having a bottom end that is closed off to require dust entrained gas from inlet 12 to flow through the filter material. The upper end of each filter bag 26 is open and is formed to include a flexible ring 28 that is made integral therewith by a process of weaving or sewing to form an annular groove 32 which fits tightly within an aperture of the tube sheet to hold the filter bag tightly thereto.

Above each bag is a nozzle 31 that receives compressed cleaning air from a source 30 and exhausts a jet of compressed air into the open end of each bag to cause a momentary reversal of flow through each bag and a reverse flexing of a filter bag. As the filter bag flexes outwardly, deposits of dust on the outer surface thereof break loose from the bag and fall to the bottom of the housing where they are removed through a cleanout valve 34.

Each filter bag is provided with a skeletal cage that prevents the bag from collapsing when deposits of dust collect on the outer surface thereof and increase the resistance to flow therethrough. The cage comprises longitudinal wires 38 having spaced transverse rings 42 that support the bag against excess pressure outside the bag.

The upper end of each longitudinal wire 38 is welded to a collar 44 that includes a tubular portion 46 adapted to fit into the flexible ring 28 and a radial stabilizing flange 48 lying normal thereto that is adapted to extend outward and contact the upper surface of tube sheet 22 around the periphery of each aperture 24. The flange is formed with a peripheral edge 52 that extends down to provide positive contact with the upper surface of the tube sheet whereby when in contacting position the cage will lie positively perpendicular to the tube sheet and in axial alignment with nozzle 31. The collar 44 is split on its longitudinal periphery at 54 and expanded to a slight degree whereby it has a diameter greater than that of flexible ring 28. By radial compression of the collar 54, however, the collar may be inserted within the ring 28 to hold the groove 32 thereof next to the periphery of the aperture in the tube sheet.

To lock the collar 46 against the ring 28, the venturi collector 56 is formed to include a skirt 58 that is sized to fit snugly inside the split ring 54 when it is expanded against the ring 28. The skirt connects onto the venturi collector 56 in concentric alignment therewith whereby the nozzle 31 is always in positive alignment with the venturi.

To further positively link the venturi collar together with the split collar, a detent is formed between abutting surfaces. Thus, the split collar is formed with an inner convex surface 62 that mates with a concave surface 64 on the outer surface of skirt 58 whereby juxtaposition of the convex surface of the split collar and the concave surface of the skirt expands the collar to lock the collar and the venturi collector together into an integral assembly.

A lateral ring 66 is formed at the upper edge of concave surface 64 whereby it forms an abutment that lies adjacent the upper surface of flange 48 when the skirt 58 is completely in place adjacent the split collar.

We claim:

1. Bag filter apparatus including a filter housing enclosing a filter compartment having an inlet for gas to be filtered and an outlet for the exhaust of clean gas therefrom, an apertured tube sheet intermediate the inlet and outlet separating the filter compartment into an inlet compartment for dirty gas and an outlet compartment for clean gas, nozzle means positioned above each aperture of said tube sheet to exhaust a blast of compressed air thereto, an elongate filter bag having an open end thereof held against the periphery of each aperture of said tube sheet and a closed end depending perpendicularly therefrom, a flexible ring integral with each filter bag having a concentric groove therein interlocking with the periphery of an aligned aperture in the tube sheet, a bag support assembly adapted to maintain axially disposed segments of each filter bag continuously concentric with said nozzle means, said support assembly comprising an elongate cage supporting each filter bag, an annular split collar connected to each cage having a radial stabilizing flange which contacts the upper side of said tube sheet around the periphery of each aperture, and a fitting having a venturi shaped collector coaxial with an annular skirt positioned and arranged in the split collar to expand said split collar outward against the flexible ring to hold it in a fixed position concentric with said nozzle means.

2. Bag filter apparatus as defined in claim 1 wherein the annular collar having an annular convex surface on its inner periphery which is positioned and arranged, an annular convex surface on the inner periphery of the split collar adapted to cooperate with the concave surface of the annular skirt whereby the annular skirt and split collar are held together in coaxial engagement.

3. Bag filter apparatus as defined in claim 2 including an annular projection on the annular skirt that has a diameter somewhat greater than the annular diameter of the split ring whereby lateral juxtaposition of the annular skirt and the split ring expands the split ring radially outward into lateral abutment with the flexible ring and the periphery of one of said apertures in the tube sheet.

* * * * *